May 25, 1948.　　　F. H. DAWLEY　　　2,442,198
VINEYARD CULTIVATOR
Filed March 28, 1946　　3 Sheets-Sheet 1

Inventor
Francis H. Dawley
by Popp and Popp
Attorneys

May 25, 1948.  F. H. DAWLEY  2,442,198
VINEYARD CULTIVATOR
Filed March 28, 1946　　3 Sheets-Sheet 2
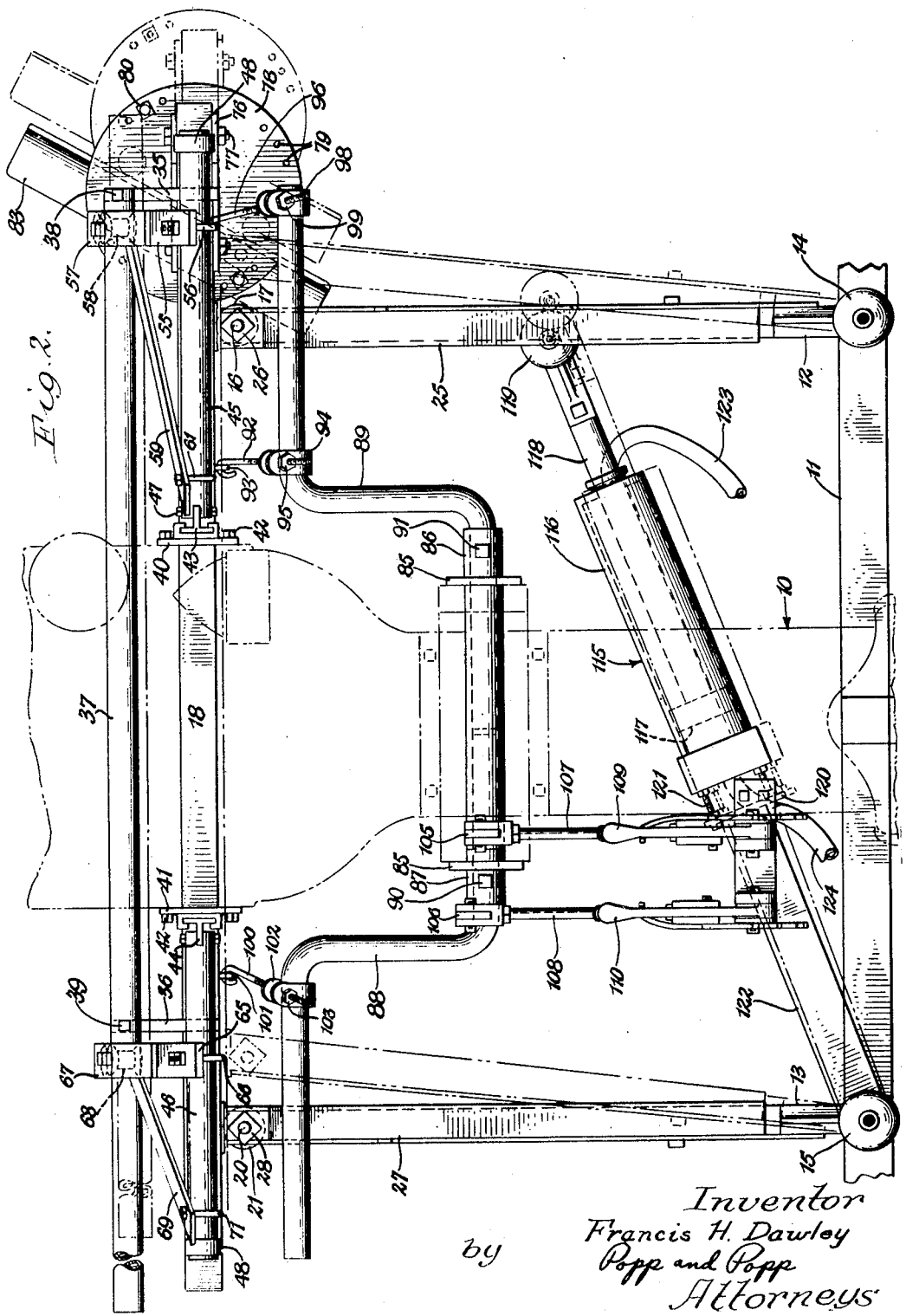
Inventor
Francis H. Dawley
by Popp and Popp
Attorneys

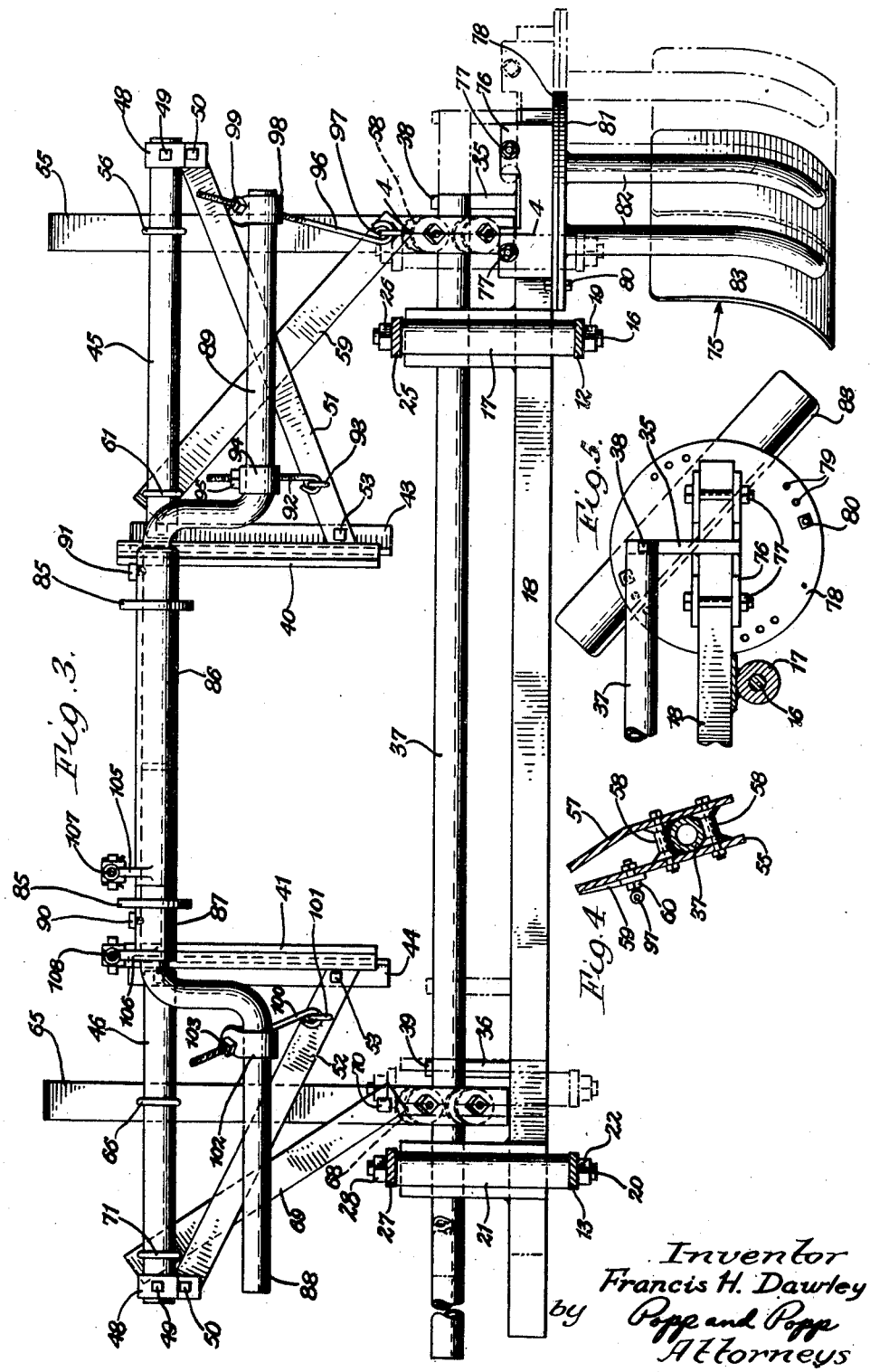

Patented May 25, 1948

2,442,198

UNITED STATES PATENT OFFICE 2,442,198

VINEYARD CULTIVATOR

Francis H. Dawley, Silver Creek, N. Y.

Application March 28, 1946, Serial No. 657,818

2 Claims. (Cl. 97—137)

This invention relates to cultivators and more particularly to a cultivator for cultivating or hoeing grape vines.

As is well known grapes are grown on vines which hang on fences or trellises arranged in parallel rows. The usual method of mechanically cultivating a grape vineyard is to cultivate the space or clearing between the rows of fences but leave the sections of earth in line with the fences and immediately under the vines untouched. The weeds growing on these uncultivated stretches are undesirable and must be removed by manual hoeing which requires a great amount of time and labor.

The principal object of the present invention is to provide a mechanically operated cultivator for cultivating or hoeing a grape vineyard, especially the earth around the roots of the vines and the patches of earth between vines arranged in the same row, in a continuous operation.

Another object is to mount such a cultivator on a prime mover which can be driven parallel to the rows of grape vines and controlled to cultivate the earth around and in line with successive vines in the same row while the prime mover is moving.

Another object is to provide such a cultivator with its cultivating tool or hoe laterally extensible or retractable as desired and controlled by the operator.

Another object is to provide such a cultivator with means to adjust the vertical position of the cultivating tool or hoe so as to cultivate the earth to the desired depth.

Another object is to provide such a cultivator with means for adjusting the angularity of the cultivating tool or hoe with respect to the line of travel of the cultivator so as to obtain the desired type of cultivation.

Another object is to mount such a cultivator on a tractor or other suitable prime mover with controls for the cultivator conveniently arranged so that only one person is required to operate the tractor and cultivator with a minimum of effort.

A further object is to provide such a mechanical cultivator which is simple in construction, inexpensive to manufacture, not liable to get out of order and easy to maintain.

Additional objects of the present invention will be readily apparent from the following description and accompanying drawings wherein:

Fig. 2 is a top plan view thereof.

Fig. 3 is a sectional view taken generally along the line 3—3, Fig. 1.

Fig. 4 is a fragmentary section taken along the line 4—4, Fig. 3.

Fig. 5 is a fragmentary top plan view of the cultivating tool and its adjusting means.

Figure 1:
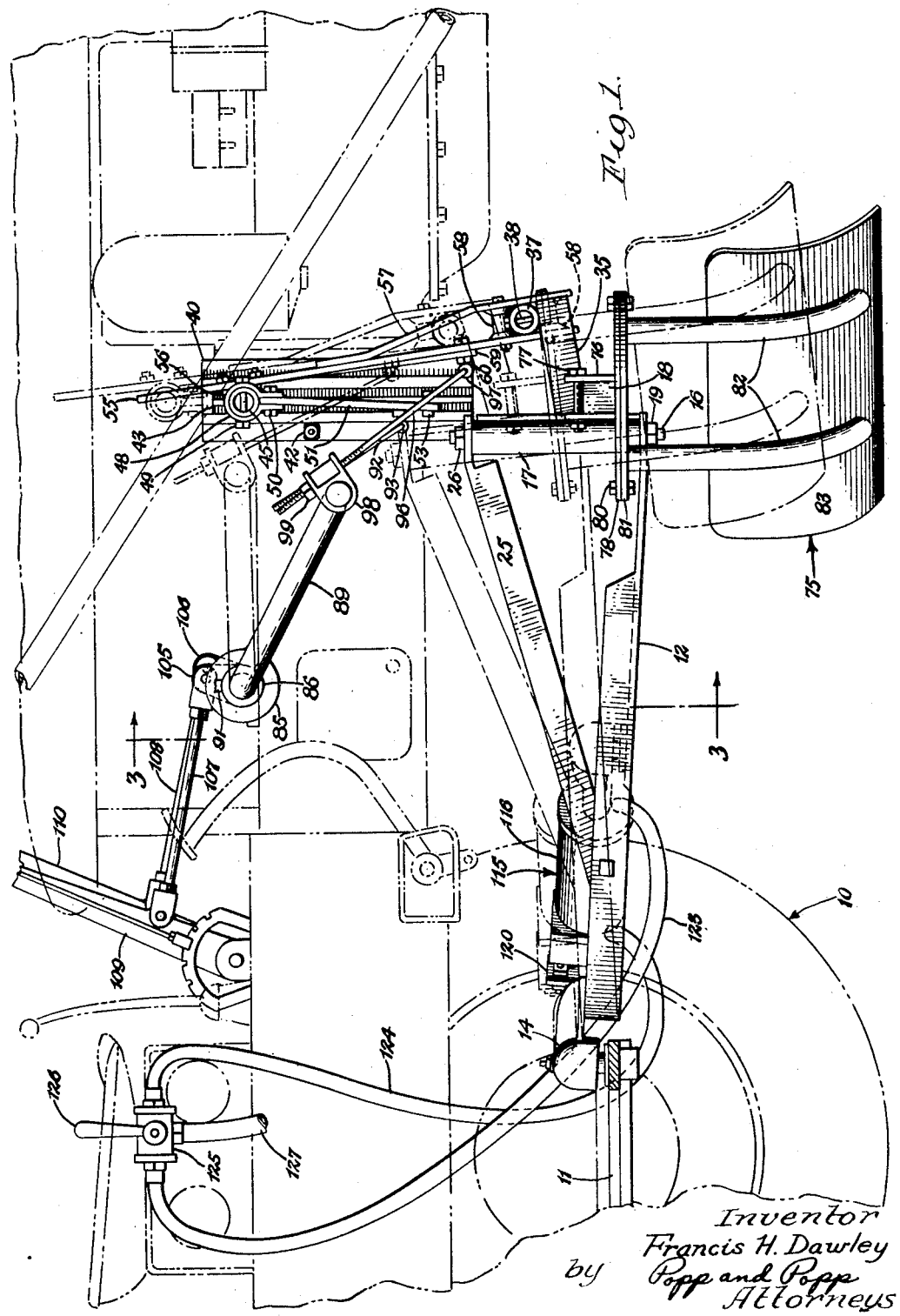
Fig. 1 is a side elevation of the mechanical cultivator forming the subject of the present invention.

The mechanical cultivator comprising the present invention is shown as mounted on a conventional type of farm tractor, illustrated in outline form by dotted lines in Fig. 1 and represented by the numeral 10, although any other suitable prime mover or wheeled carrier can be used. The tractor is shown as carrying a frame member 11 to which cultivator frame side arms 12 and 13 are connected by ball and socket connections 14 and 15 respectively. These side arms 12 and 13 are parallel to each other and extend forwardly from the frame member and lie in a generally horizontal plane. The right side arm 12 is provided with a hole near its forward end to receive the lower end of a spindle 16 rotatably arranged in a bushing sleeve 17 which is suitably made fast, as by welding, to a transverse frame bar or member 18, a nut 19 being screwed on the threaded end of the spindle 16 and holding the arm 12 in position. Similarly the left side arm 13 is provided with a hole to receive the lower end of a spindle 20 rotatably arranged in a bushing sleeve 21 which is suitably made fast as by welding to the transverse frame bar 18, a nut 22 being screwed on the threaded end of the spindle 20 and holding the arm 13 in position. The center to center distance between the socket connections 14 and 15 is the same as the center to center distance between the spindles 16 and 20. Also, the center to center distance between the socket connection 14 and the spindle 16 is the same as the center to center distance between the socket connection 15 and the spindle 20. It will thus be seen that a parallelogram linkage or frame is provided by the frame member 11, right side arm 12, left side arm 13 and transverse bar 18. The parallelogram so formed is mechanically adjustable through remote control means in a manner hereinafter described.

The right side arm 12 is braced by a brace bar 25 suitably connected at its rear end to the arm 12 at a point intermediate the ends of the arm and extending upwardly and forwardly and provided with a hole near its forward end to receive the upper end of the spindle 16, the nut 26 being screwed on the threaded end of the spindle 16 and holding the brace bar 25 in position. The left side arm 13 is also similarly braced by a brace bar 27 suitably connected at its rear end to the arm 13 at a point intermediate the ends of the arm and extending upwardly and forwardly and provided with a hole near its forward end to receive the upper end of the spindle 20, the nut 28 being screwed on the threaded end of the spindle 20 and holding the brace bar 27 in position.

Rigidly connected as by welding, to the horizontal transverse frame bar 18 and extending upwardly and forwardly are right and left extension bars 35 and 36. A horizontal transverse thrust rod 37 is mounted on the ends of the extension bars 35 and 36 and is shown as secured to the same by bolts 38 and 39, respectively, although it is to be understood that any other suitable fastening means can be employed. The thrust rod 37 is so arranged on the extension bars 35 and 36 that a substantial portion of its length extends laterally to the left of the extension bar 36.

As best shown in Figs. 1 and 2, vertical right and left guide plates 40 and 41, respectively, are rigidly secured to the sides of the tractor 10 in any suitable manner as by screws 42, and are shown as arranged substantially vertically above the horizontal transverse frame bar 18. These guide plates 40 and 41 are adapted to slidably receive slide members 43 and 44, respectively, which are T-shaped in cross section. Laterally extending horizontal bars 45 and 46 are vertically slotted at their inner ends to receive the vertical ribs of the corresponding slide members 43 and 44, and are fastened to the same by bolts 47—47 or in any other suitable manner. Brackets 48—48 are suitably secured as by bolts 49—49 to the outer ends of the bars 45 and 46 to which brackets are also connected as shown by bolts 50—50 right and left bracing arms 51 and 52 which extend downwardly and inwardly and are secured at their lower ends to the ribs of the respective slide members 43 and 44 as by bolts 53—53 or in any other suitable manner. It will therefore be seen that the bars 45 and 46 are held in a substantially horizontal position by the bracing arms 51 and 52 and are capable of moving vertically up and down with their companion slide members 43 and 44.

As shown in Fig. 3, a substantially vertical thrust arm 55 is suitably fastened to the arm 45 as by a U-bolt 56 and extends downwardly and slightly forwardly past the rear side of the horizontal transverse thrust rod 37. An auxiliary thrust arm 57 is arranged on the forward side of the arm 55 in spaced relation thereto and is shown as having its upper portion bent rearwardly to engage the arm 55 to which it is welded or fastened in any other suitable manner. A pair of rollers or spools 58—58 embrace opposite sides of the transverse thrust bar 37 and are rotatably mounted one above the other on the thrust arm 55 and auxiliary thrust arm 57. The rollers or spools 58—58 permit the transverse rod 37 to move back and forth through the rollers. The thrust arm 55 is braced against lateral displacement with respect to the bar 45 by the diagonal brace bar 59 fastened at its lower end to the arm 55 by the bolt 60 or in any other suitable manner and at its opposite end to the bar 45 by the U-bolt 61 or in any other suitable manner.

A substantially vertical thrust arm 65 is shown as secured to the horizontal bar 46 by the U-bolt 66 on the left side of the tractor and is similar to the thrust arm 55. Thus the arm 65 extends downwardly and slightly forwardly past the rear side of the horizontal transverse thrust rod 37; has secured to it an auxiliary thrust arm 67 between and on which another pair of rollers or spools 68—68 are rotatably mounted so as to embrace and roll on the rod 37. The thrust arm is braced by the diagonal brace bar 69 secured at its lower end to the arm 65 by the bolt 70 and at its upper end to the horizontal bar 46 by the U-bolt 71, although it is readily apparent any other suitable securing means can be employed.

The right end of the transverse frame bar 18 is shown as carrying the cultivating tool or hoe, indicated generally at 75, in such manner that the same is adjustable about a vertical axis with respect thereto. To accomplish this a channel-shaped bracket 76 is suitably secured to the end of the bar 18 as by the bolts 77—77. A disk plate 78 fast to the bottom of the bracket 76 is provided with a series of holes 79 through which bolts 80 pass and also through registering holes provided in a second disk plate 81 thereby locking the two plates 78 and 81 together. Depending arms 82—82 are shown welded to the bottom of the second disk plate 81 and carry the hoe blade 83 which may be of any desired form or shape. By providing a plurality of registering holes 79 in the disk plates 78 and 81, it is readily apparent that the cultivating tool 75 can be adjusted about a vertical axis to any desired position of angularity with respect to the line of travel of the cultivator.

Means are provided to vertically adjust the cultivating element 75 so that cultivation to any desired depth can be obtained. For this purpose the frame of the tractor 10 is provided with transversely spaced journal plates 85—85 which receive a sleeve formed in two sections 86 and 87, these sleeve sections internally receiving a yoke-shaped lifting arm assembly comprising a left arm 88 and a right arm 89, as best shown in Fig. 3. The left arm 88 is prevented from rotating in the sleeve section 87 by the screw 90, the inner end of the left arm 88 extending completely through the sleeve section 87 and part way into the sleeve section 86. The inner end of the right arm 89 extends part way into the sleeve section 86 and is prevented from rotating with respect thereto by the screw 91.

The right lift arm 89 is operatively connected to the right side of the cultivator frame by means of the hanger rod 92 formed at its lower end to provide a hook which engages the eye 93 secured to the right bracing arm 51 and threaded at its upper end which extends through holes in a U-shaped clamp 94 and held in adjustable position by the nut 95. A second hanger rod 96 assists in supporting the cultivator frame and has a hook at its lower end to be received by the eye 97 mounted on the diagonal brace bar 59, the upper end of the rod 96 extending through holes provided in a U-shaped strap or clamp 98 arranged on the end of the right lift arm 89 and being threaded to receive the nut 99. It will be seen that the nuts 95 and 99 can be adjusted to properly distribute the load carried by the right lift arm 89.

The left lift arm 88 supports the left side of the cultivator frame by means of the hanger rod 100 formed at its lower end to provide a hook which is received by the eye 101 attached to the bracing arm 52 and having its upper end extending through holes provided in a U-shaped strap or clamp 102 which embraces the arm 88 and being threaded for a nut 103. The nut 103 can be adjusted to insure proper vertical positioning of the left side of the cultivator framework.

The sleeve sections 86 and 87 are respectively shown as provided with upstanding levers 105 and 106 formed integrally therewith, to the upper ends of which tie rods 107 and 108, respectively, are pivotally connected. Hand operating levers 109 and 110 are pivotally connected to the opposite ends of the tie rods 107 and 108, respectively, and are suitably journaled on the frame of the tractor 10 and capable of being locked in a given position in any conventional manner. It will be readily seen that the operator can manually move the operating levers 109 and 110 to elevate or depress the cultivator frame thereby to elevate or depress the cultivating element 75 in order to cultivate the earth to the desired depth. Thus when the operator pulls back on both operating levers 109 and 110, the tie rods 107 and 108 rotate the levers 105 and 106 thereby rotating the sleeve sections 86 and 87 and lift arms 88 and 89 about their common axis. The hanger rods 92, 96 and 100 are therefore pulled upwardly by the lift arms 88 and 89 and lift the cultivator frame by causing the slide members 43 and 44 to slide upwardly in their respective guide plates 40 and 41. This upward movement of the cultivator frame, of course, raises the thrust arms 55 and 65 and through their respective sets of rollers 58—58 and 68—68 lift the transverse thrust bar 37 and transverse bar 18 which carries the cultivating tool 75. A raised position of the cultivating tool and cultivator frame is shown by dotted lines in Fig. 1.

If it is desired to depress the cultivating tool 75 the operating levers 109 and 110 are pushed forwardly by the operator thus permitting the weight of the cultivator frame to lower the cultivating tool.

In order to move the cultivating tool 75 laterally, inwardly or outwardly, fluid operated means controlled from a remote point are provided to actuate the parallelogram formed by the side arms 12 and 13, frame member 11 and transverse frame bar 18. As best shown in Fig. 2, a double acting piston and cylinder assembly, indicated generally by the numeral 115, is arranged between the ball and socket connection 15 and the right side arm 12. This assembly comprises a cylinder 116 in which is arranged a longitudinally slidable piston 117 with its piston rod 118 extending through one end wall thereof and suitably connected by means of a ball and socket connection 119 to the side arm 12 at a point intermediate the ends thereof. The opposite end of the cylinder 116 carries a plate 120 spaced apart therefrom by means of a plurality of adjustable screws 121. A bar 122 connects the plate 120 with the ball and socket connection 15. Any suitable fluid, such as hydraulic oil, can be selectively introduced to either side of the piston 117 by the lines 123 and 124 which lead to a control valve 125 actuated by the manually operated control valve lever 126, the numeral 127 representing the main fluid supply line connecting the control valve 125 with any suitable means (not shown) carried by the tractor 10 for supplying the fluid under pressure. The valve 125 is conveniently arranged for the operator so that the valve control lever 126 is readily accessible to him.

If the control valve lever 126 is pushed forwardly by the operator the valve 125 permits fluid under pressure to pass through the line 124 into the cylinder 116 and forces the piston 117 to move so as to push the piston rod 118 out of the cylinder and thereby rotate the side arm 12 in a clockwise direction as viewed in Fig. 2. The fluid in the cylinder on the opposite side of the piston is forced out through the line 123. Movement of the side arm 12 will shift the parallelogram formed by the side arms 12 and 13, frame member 11 and transverse frame bar 18 to the right thereby moving the cultivating tool 75 carried on the end of the frame bar 18 to the right. In this lateral movement to the right of the frame bar 18 with its cultivating tool 75, the transverse thrust bar 37 is pulled through the sets of rollers 58—58 and 68—68 which are carried by the generally vertically arranged thrust arms 55 and 65, respectively. The U-bolts 56, 61, 66 and 71 respectively, permit the thrust arms 55 and 65 with their companion diagonal brace bars 59 and 69 to rotate slightly about their respective laterally extending horizontal bars 45 and 46 in order to accommodate the slight rearward movement of the transverse thrust rod 37 when the parallelogram linkage is shifted to the right, as viewed in Fig. 2. Similarly any forward movement of the transverse thrust rod 37 occasioned by shifting the parallelogram linkage to the left is accommodated in the same manner. Figs. 2 and 3 show a dotted line position of the assembly when shifted to the right.

To move the cultivating tool 75 laterally inwardly or to the left, as viewed in Fig. 2, the operator moves the control valve lever to a rear position and fluid under pressure is permitted to pass through the line 123 into the cylinder 116 and bear against the right face of the piston 117 thereby pulling the piston rod 118 into the cylinder and rotating the side arm 12 in a counterclockwise direction and shifting the parallelogram linkage and cultivating tool 75 as hereinabove described to the left, the fluid on the left side of the piston 117 being forced out through the line 124.

It will be understood that the operator can hydraulically lock the cultivating tool 75 in any desired laterally displaced position by returning the control valve lever 126 to the position thereof shown in Fig. 1. It is further to be noted that the operator can control the speed of shifting the cultivating tool 75 in either direction from one position to another by the amount he opens the valve 125, thus permitting easily controlled, selective operation.

It is also pointed out that the lateral displacement of the cultivating tool 75 is intended to take place in response to the operator's control as he drives the tractor between rows of grape vines. Thus he can very easily shift the cultivating tool 75 laterally farther away or closer to the tractor to go around the roots of vines to cultivate the earth close to the same and also cultivate the patches of earth between vines arranged in the same row.

From the foregoing it will be seen that the present invention provides a mechanical cultivator especially adapted for cultivating grape vines in a manner such that the cultivating tool or hoe can be laterally extended or retracted while being moved in a longitudinal direction to follow an irregular course as desired and controlled by the operator; which is simple in construction and not liable to get out of repair, easy to maintain, inexpensive to manufacture, adapted for mounting on any conventional type of farm tractor, and most easy to operate from controls conveniently arranged for the operator. The cultivating tool is also readily vertically adjustable so as to cultivate the earth to any desired depth and adjustable about a vertical axis to obtain the angularity of the cultivating tool desired with respect to the longitudinal line of travel of the cultivator.

I claim as my invention:

1. In combination with a self-propelled tractor having a main frame, cultivating apparatus comprising, a vertical guideway on each lateral side of said main frame, a support frame mounted on each of said guideways for vertical movement thereon, means arranged to independently adjust the vertical position of each of said support frames on its companion one of said guideways, an elongated member guideably arranged on said support frames for rectilinear reciprocatory movement beyond the lateral side of said tractor and in a direction transverse of the line of movement of said tractor, a cultivating tool on the outer end of said elongated member, a power actuated prime mover for reciprocating said elongated member rectilinearly while said tractor is in motion, and manually operated control means arranged on said main frame adjacent the station of the operator of said tractor to selectively control the operation of said prime mover.

2. In combination with a self-propelled tractor having a main frame, cultivating apparatus comprising, a vertical guideway on each lateral side of said main frame, a support frame mounted on each of said guideways for vertical movement thereon, means arranged to independently adjust the vertical position of each of said support frames on its companion one of said guideways, an elongated member guideably arranged on said support frames for rectilinear reciprocatory movement beyond the lateral side of said tractor and in a direction transverse of the line of movement of said tractor, a cultivating tool on the outer end of said elongated member, a pair of transversely spaced parallel arm members extending rearwardly from said elongated member, means pivotally connecting the front ends of said arm members to said elongated member, means pivotally connecting the rear ends of said arm members to said main frame, a fluid actuated extensible and contractable prime mover operatively interposed between said main frame and one of said arm members for laterally shifting the angularity of said arm members about their rear pivots, and manually operated control means arranged on said main frame adjacent the station of the operator of said tractor to selectively control the operation of said prime mover.

FRANCIS H. DAWLEY.

REFERENCES CITED

The following references are of record in the file of this patent:

UNITED STATES PATENTS

| Number | Name | Date |
|---|---|---|
| 357,788 | Root et al. | Feb. 15, 1887 |
| 1,936,749 | Cady et al. | Nov. 28, 1933 |
| 2,206,283 | Jacobs et al. | July 2, 1940 |
| 2,253,130 | Lund | Aug. 19, 1941 |
| 2,269,344 | Nelson | Jan. 2, 1942 |
| 2,320,148 | Lindgren et al. | May 25, 1943 |
| 2,361,083 | Burnett | Oct. 24, 1944 |
| 2,391,224 | Carter | Dec. 18, 1945 |

FOREIGN PATENTS

| Number | Country | Date |
|---|---|---|
| 184,894 | Great Britain | Aug. 24, 1922 |
| 192,065 | Canada | Aug. 12, 1919 |
| 394,759 | Germany | May 6, 1924 |
| 629,858 | Germany | May 15, 1936 |